April 18, 1961 E. S. WANLESS 2,980,105
CONDENSATE COLLECTING APPARATUS
Filed Oct. 30, 1957
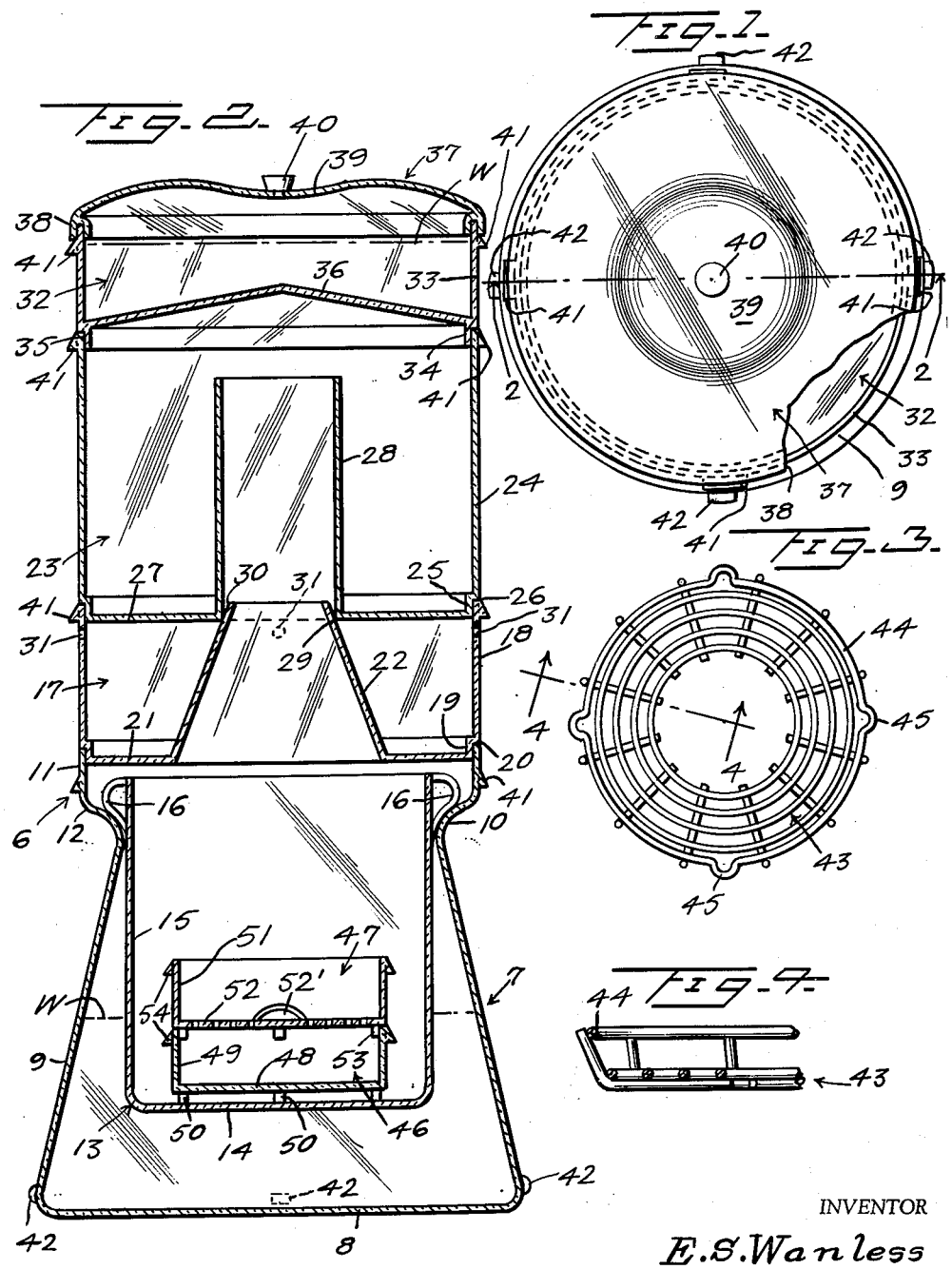
INVENTOR
E.S. Wanless
BY John N. Randolph
ATTORNEY United States Patent Office 2,980,105
Patented Apr. 18, 1961

2,980,105

CONDENSATE COLLECTING APPARATUS

Earl S. Wanless, Evanston, Ill.
(247 5th Ave., Viroqua, Wis.)

Filed Oct. 30, 1957, Ser. No. 693,458

2 Claims. (Cl. 126—382)

This invention relates to a utensil of simple construction capable of being effectively utilized for sterilizing water.

Another object of the invention is to provide a sterilizer which may be readily maintained in a clean and sanitary condition.

Various other objects and advantages of the invention will hereinafter become more fully apparent from the following description of the drawing, illustrating a presently preferred embodiment thereof, and wherein:

Figure 1 is a top plan view, partly broken away, of the condensate collecting apparatus;

Figure 2 is a vertical sectional view thereof taken substantially along a plane as indicated by the line 2—2 of Figure 1;

Figure 3 is a plan view on a reduced scale of a grate for use with the apparatus, and Figure 4 is an enlarged fragmentary sectional view thereof, taken substantially along a plane as indicated by the line 4—4 of Figure 3.

Referring more specifically to the drawing, the condensate collecting apparatus is designated generally 6 and includes a lower receptacle, designated generally 7, having a substantially flat bottom 8 and an annular upwardly tapered side wall 9 which extends upwardly from said bottom and which is flared near the upper end thereof above a restricted annular neck portion 10 of the lower vessel 7. The vessel 7 has a substantially cylindrical top portion 11 forming an extension of the annular outwardly flared portion 12. Said flared portion 12 constitutes an extension of the restricted neck 10.

An inner receptacle 13 is detachably mounted in the lower receptacle 7 and includes a substantially flat bottom 14 and a substantially cylindrical side wall 15 which extends upwardly from the bottom 14. The receptacle 13, like the receptacle 7, has an open upper end, and the external diameter of the receptacle 13 is slightly less than the internal diameter of the restricted neck 10. The side wall 15, at the upper end of the receptacle 13, is provided with externally disposed handles 16 which are preferably located opposite to one another and which are adapted to rest upon the annular flared portion 12 and to extend into the neck 10 for supporting the receptacle 13 within the lower receptacle 7. The receptacle 13 is of a length substantially less than that of the receptacle 7 so that when it is mounted therein, as illustrated in Figure 2, the bottom 14 thereof will be disposed substantially above and spaced from the bottom 8 and the open upper end of the receptacle 13 will be disposed beneath and spaced from the open top of the receptacle 7. Also a slight space will exist between the wall 15 and the neck 10, except where the lower ends of the handles 16 engage in said neck.

A container 17 is provided with a cylindrical wall 18 of a diameter corresponding to the diameter of the cylindrical upper end 11 of the receptacle 7. Said cylindrical wall 18 has an inwardly offset lower end portion 19 which is sized to fit snugly in the upper part of the cylindrical upper portion 11. The container 17 has an annular downwardly facing shoulder 20 between the wall portions 18 and 19 which rests upon the upper edge of the wall portion 11 for supporting the container 17 upon and within the open top of the receptacle 7 and with the bottom 21 of the container 17 disposed above and spaced from the open top of the inner receptacle 13. Said bottom 21 is substantially flat and of annular formation and extends inwardly from the lower edge of the lower wall portion 19. The container 17 is provided with a centrally disposed upwardly extending and upwardly tapered frusto-conical vapor conduit 22 the larger lower end of which merges integrally with the inner edge of the bottom 21 and the restricted open upper end of which is disposed at approximately the level of the open top of the container 17.

A container 23 is detachably supported on the container 17 and includes a cylindrical side wall 24 of the same diameter as the wall 18 and which has an inwardly offset lower end portion 25 and a downwardly facing annular shoulder 26, corresponding to the inwardly offset wall portion 19 and shoulder 20, respectively. The shoulder 26 rests on the upper edge of the wall 18 and the inwardly offset lower wall portion 25 fits snugly within the upper portion of the wall 18. The container 23 has a substantially flat annular bottom 27 which extends inwardly from the lower edge of the wall portion 25 and which supports a substantially cylindrical vapor conduit 28 which is formed integral with and extends upwardly from the inner edge of the annular bottom 27, and which terminates beneath and spaced from the open top of the receptacle 23. The open lower end of the vapor conduit 28 has a larger internal diameter than the open upper end of the vapor conduit 22 and said lower end of the conduit 28 and the bottom 27 are disposed below the level of the upper end of the conduit 22, when the shoulder 26 is resting upon the upper edge of the wall 18, as seen in Figure 2. When the container 23 is thus supported on the container 17, the upper end of the conduit 22 extends into the conduit 28 and the lower end of the conduit 28 contacts the conduit 22 below the upper end of said conduit 22, as indicated at 29, completely around the conduit 22. The lower portion of the conduit 28 thus combines with the upper portion of the conduit 22 to form an annular trough 30 of substantially V-shape cross section. The wall 18 is also provided with openings 31 which are disposed slightly below the level of the bottom 27 when the container 23 is supported on the container 17, as seen in Figure 2.

An upper receptacle 32 which is preferably of a depth less than the depth of the container 17 includes a cylindrical side wall 33 of the same diameter as the walls 18 and 24 and which has an inwardly offset lower portion 34 and a downwardly facing annular shoulder 35, corresponding to the inwardly offset portion 19 and shoulder 20, respectively. The shoulder 35 rests upon the upper edge of the wall 24 and the wall portion 34 fits snugly in the upper portion of the wall 24. The upper container 32 has a bottom 36 which is formed integral with the upper edge of the inwardly offset wall portion 34 and which is dome shaped so that it is inclined downwardly and outwardly from the center thereof to its periphery.

A lid 37 is mounted on and closes the open top of the container 32 and has an annular downwardly opening channel or groove 38 at its outer edge which fits over the upper edge of the wall 33. The lid 37 is bulged upwardly from said peripheral portion 38 and has a dished central portion 39 which is disposed below the level of the surrounding portion of the lid 37. The lid 37 has a knob or handle 40 secured to and rising from its dished central portion 39.

Each of the receptacles 7, 17, 23 and 32 is provided near its open upper end with externally disposed handles 41. The wall 9 of the receptacle 7, near the bottom 8, is provided with externally disposed circumferentially spaced lugs 42. A grate 43 is adapted to be disposed beneath the bottom 8 and has an upwardly offset ring member 44 forming a rim thereof which is of a diameter to fit relatively snug around the lower portion of the wall 9 and which has circumferentially spaced outwardly offset portions 45, corresponding in number and spacing to the lugs 42, through which said lugs can pass downwardly when the receptacle bottom 8 is inserted downwardly into the grate 43. By then turning the receptacle 7 slightly in either direction relative to the grate 43, the lugs 42 can be positioned out of alignment with the portions 45 for locking the grate 43 on the bottom of the receptacle 7. The grate 43 is only utilized when the bottom 8 of the receptacle 7 is to be positioned over a surface type burner in order to space said bottom 8 from the burner.

If desired, the apparatus 6 may be utilized for cooking instead of sterilizing by placing one or more receptacles of food to be cooked within the inner receptacle 13. Said receptacles may be in two forms as shown in Figure 2 including a receptacle, designated generally 46, and a receptacle, designated generally 47. The receptacle 46 has a substantially flat bottom 48 and an upstanding cylindrical wall 49 the upper end of which defines the open top thereof. The bottom 48 is provided with depending foot members or legs 50 which are spaced inwardly from the side wall 49.

The receptacle 47 has a side wall 51 corresponding to the side wall 49 and a perforated bottom 52 which is provided with a centrally disposed raised portion 52'. The receptacle 47 has depending legs 53 corresponding to the legs 50. The walls 49 and 51 are provided with externally disposed handles 54 located adjacent the open tops of said receptacles. Any desired number of either type of receptacle 46 or 47 may be employed and said receptacles are positioned in the inner receptacle 13 in superposed relation to one another and with the legs 50 of the bottommost receptacle resting upon the receptacle bottom 14 and the legs of each of the other receptacles fitting into the receptacle disposed therebeneath for retaining said receptacles in stacked relation to one another. The individual receptacles may contain different foods to be simultaneously cooked and it will be apparent that the juices from the foods, not shown, contained in the receptacles 47 can drain through the perforated bottoms 52 into the receptacle disposed therebeneath where such a blending of the juices is desired, whereas the solid bottoms 48 of the receptacles 46 prevent escape of the juices from such receptacles and thus prevent this blending of the juices. Thus, a combination of the two receptacles may be employed or receptacles of only one or the other type may be utilized as desired and depending upon the different food products being cooked.

Said receptacles 46 and 47 and the receptacles and containers 7, 13, 17, 23 and 32 and the lid 37 are all formed of glass of a heat resistant type similar to the product commercially known as "Pyrex."

Assuming that the apparatus is assembled as illustrated in Figure 2 and that the receptacles 46 and 47 contain foods to be cooked, the lower receptacle 7 is partially filled with water, as indicated at W in Figure 2, and the uppermost container 32 is also filled with water, as indicated at W in Figure 2. Heat is applied to the bottom 8 of the lower receptacle 7. A sufficient heating of the bottom 8 will cause the water in the lower receptacle 7 to boil and the steam therefrom will pass upwardly between the wall 15 of the inner receptacle and the neck 10 and thence upwardly through the connected vapor conduits 22 and 28. This steam upon leaving the upper vapor conduit 28 will condense upon the underside of the upper container bottom 36, due to the fact that the container 32 contains cold water. This condensation will drain away from the center of the dome shaped bottom 36 and will fall therefrom and be collected in the container 23 around the vapor conduit 28. This water, not shown, thus collected in the container 23 will cool the upper vapor conduit 28 so that some of the steam will condense therein. This condensation will drain back into the annular trough 30 and will seep through between the annular contacting portions of the vapor conduits 22 and 28, as indicated at 29, so that additional water will collect in the container 17 around its vapor tube 22. The apertures 31 will permit air to escape from the containers 23 and 17 as the water accumulates therein. The accumulated water in the container 17 will cool the bottom 21 thereof and the vapor tube 22 so that a part of the steam passing upwardly through the vapor tubes will condense on the interior of the lower vapor tube 22 and will drain back therefrom into the inner receptacle 13. This will constitute the only water coming in contact with the foods, not shown, contained in the receptacles 46 and 47.

The receptacles 46 and 47 may be removed and the remaining parts may then be used solely as a still for producing sterilized or distilled water which will be collected in the receptacle 13 and containers 17 and 23.

If desired, the containers 17, 23 and 32 may be omitted and the lid 37 may be placed directly upon the upper edge of the top portion 11 of the lower receptacle 7. The steam from the receptacle 7 will then condense upon the underside of the lid 37 and will drain back into the receptacle 7.

Various modifications and changes are contemplated and may be resorted to, without departing from the function or scope of the invention as hereinafter defined by the appended claims.

I claim as my invention:

1. A condensate collecting apparatus comprising a lower receptacle adapted to contain water to be boiled and having an open top, a first open top container detachably mounted on the open top of said lower receptacle, a second open top container detachably mounted on the open top of said first container, said first and second containers each having an annular bottom and an upwardly extending centrally disposed vapor tube formed integral with and rising from the inner edge of said bottom, said vapor tubes having open ends, said bottoms and the vapor tube walls being imperforate, the vapor tube of the lower container having an upper end extending into the vapor tube of the second container, the vapor tube of said second container terminating beneath and adjacent the open top of the second container, a third open top container mounted on the open top of said second container and having an upwardly bulged bottom, a lid detachably mounted on and closing the open top of the third container, said third container being adapted to contain cold water whereby steam from said lower receptacle passing upwardly through said vapor tubes is condensed by contact with the underside of the third container so that the condensate drains from said bulged bottom into the second container, the vapor tube of said first container being upwardly tapered and having an upper portion, spaced from its upper end, loosely contacting the open bottom of the vapor tube of the second container to provide an annular upwardly opening trough therebetween in which the condensate from the vapor tube of the second container is adapted to collect for drainage back into the first container, and said first container having vent openings beneath and adjacent the open top thereof and below the level of the bottom of the second container.

2. A condensate collecting apparatus as in claim 1, an inner open top receptacle, and means supporting said inner receptacle loosely within and spaced from the bottom of said lower receptacle and beneath and spaced from said first container, the open top of said inner receptacle being larger than the lower end of the vapor tube of the first container and being disposed therebeneath for receiving and collecting condensate therefrom, said inner receptacle being imperforate.

References Cited in the file of this patent
UNITED STATES PATENTS

| | | |
|---|---|---|
| 204,353 | McClure | May 28, 1878 |
| 255,232 | Amos | Mar. 21, 1882 |
| 1,393,763 | Demuth | Oct. 18, 1921 |
| 2,439,204 | Thompson | Dec. 19, 1922 |
| 2,382,579 | Queirolo | Aug. 14, 1945 |